A CLARK.
Hay Rake and Loader.
No. 90,425.  Patented May 25, 1869.
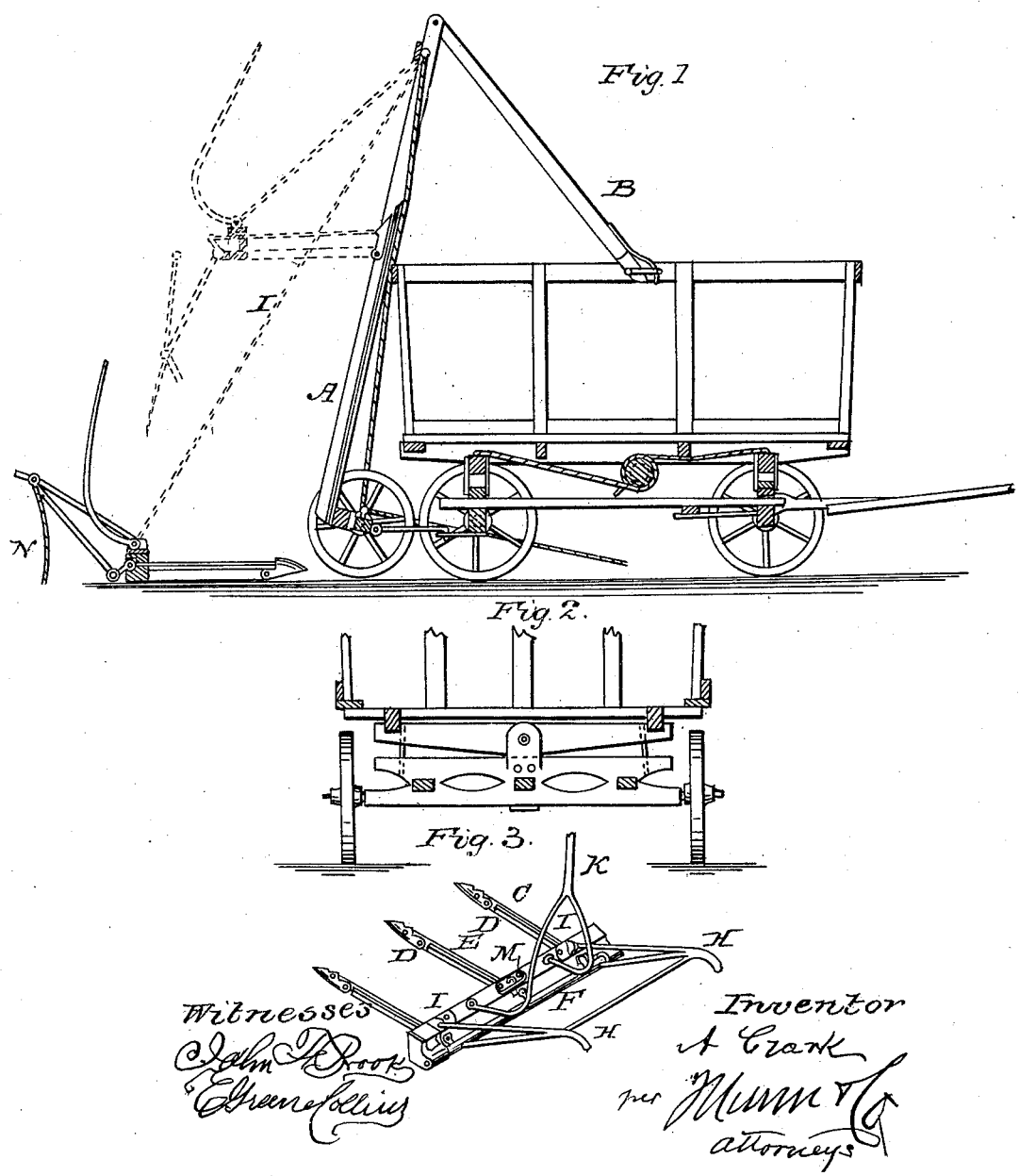

United States Patent Office.

ALBERT CLARK, OF CADIZ, OHIO.

Letters Patent No. 90,425, dated May 25, 1869.

---

IMPROVEMENT IN HAY-RAKERS AND LOADERS.

---

The Schedule referred to in these Letters Patent and making part of the same.

---

*To all whom it may concern:*

Be it known that I, ALBERT CLARK, of Cadiz, in the county of Harrison, and State of Ohio, have invented a new and improved Hay-Raker and Loader; and I do hereby declare that the following is a full, clear, and exact description thereof, which will enable others skilled in the art to make and use the same, reference being had to the accompanying drawings, forming part of this specification.

This invention relates to improvements in machinery for raking and loading hay, designed to provide a simple and effective apparatus for the same.

It consists in an improved raking-device applied to the rear of a cart, having an elevating-chute, up which the rake is caused to move when loaded, and deliver the hay to the rear of the rack behind which the cart is attached, all as hereinafter more fully specified.

Figure 1 represents a longitudinal sectional elevation of my improved apparatus;

Figure 2 represents a transverse section of the wagon; and

Figure 3 represents a perspective view of the rake.

Similar letters of reference indicate corresponding parts.

A represents an inclined chute supported on an axle and pair of wheels, connected to the rear end of the wagon by suitable rods.

The upper end of the chute terminates in an elevated framing, pivoted to the wagon-rack by the bars B, detachably connected.

C represents a rake, the teeth of which are jointed near the points at D, each tooth being connected by a rod, E, to a crank-shaft, F, arranged to revolve in bearings on the rake-head G.

To the shaft F, handles H are connected, having spring-rods or braces arranged to spring into catches I on the rake-head and hold the handles, and also the points of the teeth in the working-position, as shown in the fig. 3.

K represents a bent and crotched tongue, hinged to the rake-head, having an eye in the end, through which the elevating-cord L passes and is fastened to the head at M.

The said elevating-cord passes through an eye or over a pulley at the top of the framing, and thence to any suitable apparatus for winding it up, or to a convenient position to be drawn up by hand.

It is intended that when the rake is in the position for gathering the hay, it shall be drawn by a strap or rod, of metal, or other substance, suitably connected to the axle of the chute, and arranged to be readily engaged or disengaged with the rake-head.

When the rake has gathered the load, the attendant disconnects the spring-braces of the handles from the catches I, and turns them down to elevate the points of the teeth, so that they will ride up the chute.

He also disconnects the rake from the above-described drawing-apparatus.

Power is then applied to the hoisting-rope, and the rake thereby elevated, as shown in red, care being taken by the attendant to prevent the teeth being drawn under the lower end of the chute, by holding the rake away until it has been raised above the said bottom.

As the rake rises, it is guided by the handles until they are past reach, when a cord, N, attached thereto, serves to continue the guidance thereof.

When it arrives at the top of the chute, it will swing over the same and deliver the load.

It is then drawn back and adjusted to the working-position, by restoring the spring-braces to the catches I, and the raking proceeded with.

In case the hoisting-rope is drawn up by hand, or by any means independent of the wagon-axles, the wagon may be stopped while the elevating takes place, and the raking begun again where it was left off.

Having thus described my invention,

I claim as new, and desire to secure by Letters Patent—

1. The chute A, supported on the supplementary axle, and connected to the wagon-rack by means of the bars B, arranged as specified.

2. The combination, with the jointed fingers, of the rods E, crank-shaft F, handles H, spring-braces and rake-head G, all substantially as specified.

ALBERT CLARK.

Witnesses:
DAVID M. KERR,
THOMAS BRINDLEY.